May 15, 1934.     R. E. CONNET     1,958,610
FLUID METER
Filed Feb. 20, 1930     3 Sheets-Sheet 1

INVENTOR
Richard E. Connet
BY Thomas A. Jenkes Jr.
ATTORNEY

May 15, 1934.  R. E. CONNET  1,958,610
FLUID METER
Filed Feb. 20, 1930  3 Sheets-Sheet 3
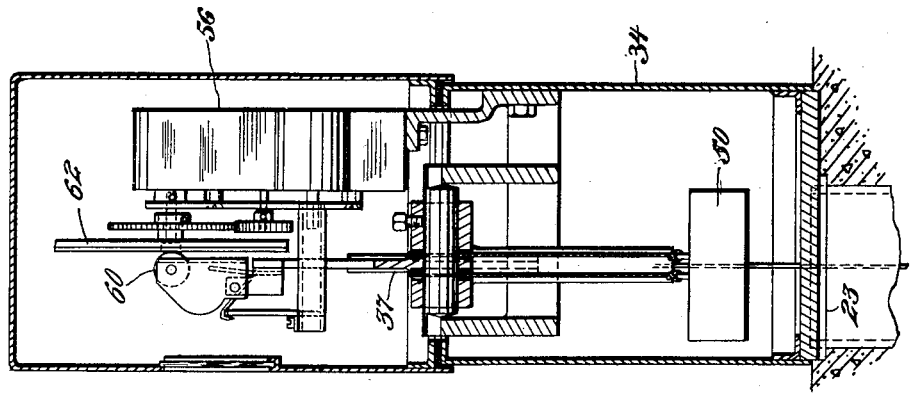
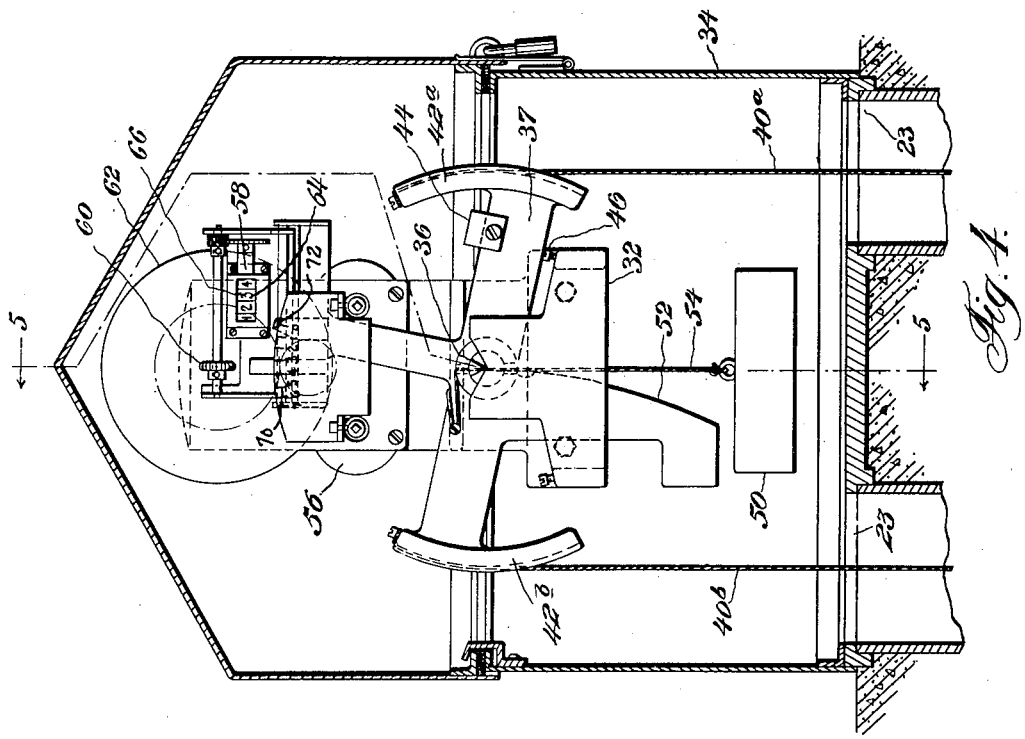
INVENTOR
Richard E. Connet
BY Thomas A. Jenkins Jr.
ATTORNEY Patented May 15, 1934

1,958,610

UNITED STATES PATENT OFFICE 1,958,610

FLUID METER

Richard E. Connet, Providence, R. I., assignor to Builders Iron Foundry, Providence, R. I., a corporation of Rhode Island Application February 20, 1930, Serial No. 430,083

12 Claims. (Cl. 73—167)

My invention relates to improvements in metering devices, particularly metering devices adapted for use in places where low-head exists.

An object of my invention is to provide a metering device so constructed as to return the indicating means thereof to zero position when the conduit is not operatively filled. I also preferably so construct my device which is particularly adapted for use for low-head metering devices, with a differential responsive means, having open-top liquid containing portions connected to said conduit, and I preferably so construct my device as to return the indicating means to zero position when the liquid containing portions of said differential responsive means are not operatively filled.

As stated, my invention is primarily adapted for use in metering large quantities of water containing refuse of various kinds such as sewerage, or for use for irrigation, and an object of my invention is to provide a meter which can be left for a long period of time and which will operate perfectly and continuously during this time. To this end, as just stated, I provide a meter which will automatically return to zero when either the conduit or the normal liquid containing portions thereof are not operatively filled, which will need no attention except the periodic reading and rewinding and which will continue to function perfectly during these long intervals.

A further object of my invention, preferably in a meter of this description, is to provide in a meter a balanced beam construction which will act directly on the indicating means thereof without interposition of any separate outside force or means, hydraulic, electric or otherwise, to indirectly actuate the indicating means, a feature I also believe new.

A further object of my invention is to provide, where an integrating mechanism is employed, an integrator which will stop integrating at or near the zero position thereof and also preferably one so constructed that when it is again desired to meter, the movable members thereof will be immediately balanced at a zero flow position.

Further objects of my invention relate to the specific type of both differential producing and differential responsive mechanisms I employ. I preferably employ a Venturi meter as this has been found ideal for use where only a low head is available and I preferably employ a differential responsive mechanism of itself adapted to contain liquid, its elements being preferably of a cylindrical shape.

In my preferred embodiment I preferably employ relatively heavy displacer elements adapted to ride vertically in a liquid in the differential responsive means, preferably so weighted as to always remain in a vertical position in respect to their axes and, where a beam is employed, to keep the connecting means between said displacer and the beam in tension.

In order that the displacement of the displacers will at all times be proportionate to their degree of immersion, all parts of each displacer are preferably constructed of equal horizontal sectional areas.

These and such other objects of my invention as may hereinafter appear will be best understood by a description of the accompanying drawings which illustrate an embodiment thereof.

In the drawings, Fig. 1 is a section through the side wall of an irrigation flume, having a conduit provided with my invention attached thereto to draw off liquid therefrom, the actual indicating means of my invention being located above the differential producing means thereof on the surface of the ground.

Fig. 4 is a detailed sectional view through the front of an indicating box, showing in elevation generally the same elements as Fig. 3 in zero position.

Fig. 5 is a sectional view taken along the line 5—5 of Fig. 4.

Figure 3:
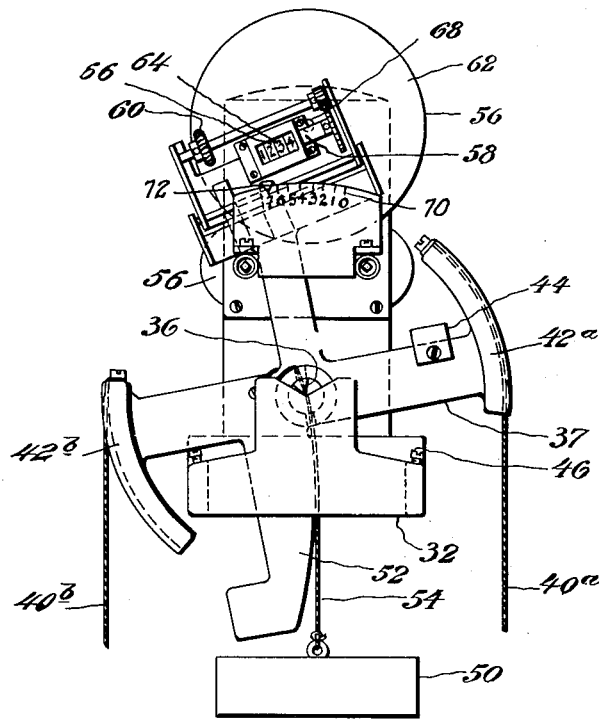
Fig. 3 is a detailed front elevation of the specific type of unbalanced beam resisting device and integrating mechanism I preferably employ in an off zero operating position.
Figure 1:
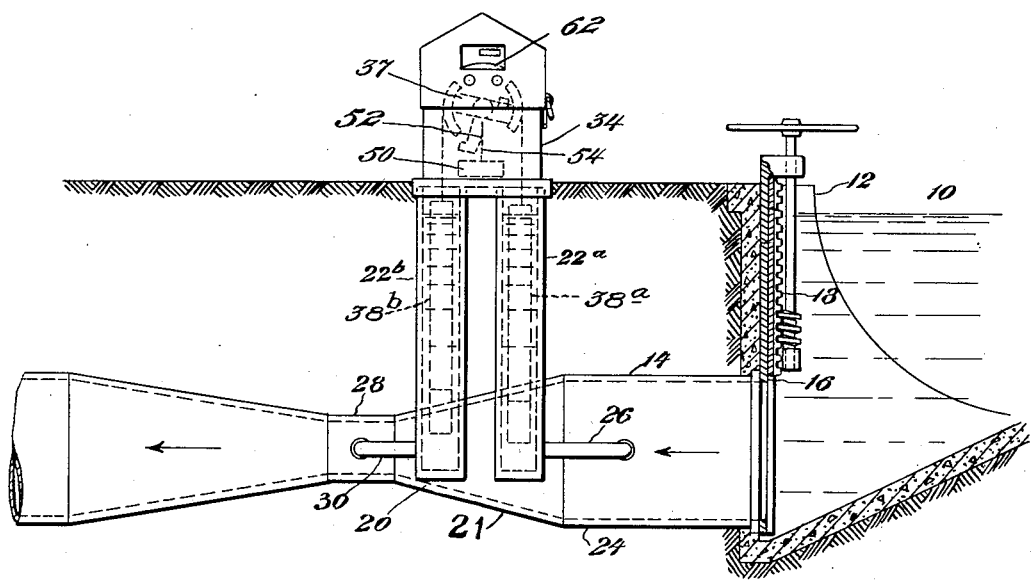
Figure 2:
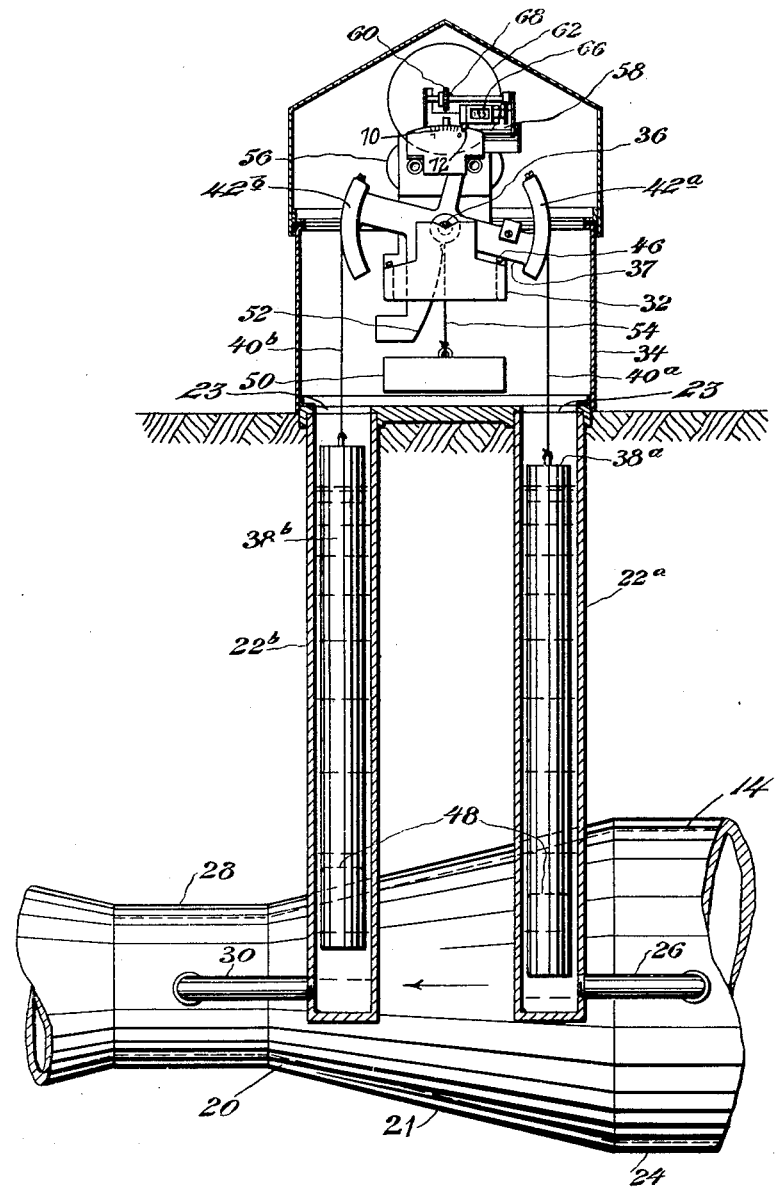
Fig. 2 is an enlarged sectional view partially shown in elevation of my improved meter connected to a portion of the conduit shown in Fig. 1.

In the drawings, wherein like characters of reference indicate like parts throughout, 10 generally indicates an irrigation flume. Said irrigation flume is preferably provided with the reinforced side wall 12 having a conduit 14 attached thereto and a slide gate 16 for said conduit raised and lowered in any suitable manner, such as by the manually operated rack 18.

While for certain features of my invention any type of means 20 to produce a pressure differential responsive to the rate of flow through the conduit 14 may be employed, I preferably employ a Venturi meter tube as the differential producing means of my invention since I have found this ideally suited for use with a low-head.

While for certain features of my invention any type of pressure differential responsive indicating means may be employed, for low-head work I preferably employ one having open-top liquid containing portions 22ª and 22ᵇ.

While any type of open-top liquid containing portions may be employed, I preferably provide the open-top wells 22ª and 22ᵇ for this purpose, sunk within the ground so as to have the lower ends thereof adjacent the pressure differential producing means 20 employed in the conduit 14. In my preferred embodiment I preferably connect the lower end of the upstream well 22ª to the upstream end 24 of the Venturi meter tube 20 by the pipe 26 and the lower end of the downstream well 22ᵇ to the throat 28 of the Venturi meter tube by the pipe 30. The difference in the level of liquid therefore in the means 22ª and 22ᵇ will be substantially responsive to the rate of flow through the conduit.

As will become more apparent later, one feature of my invention consists in constructing my entire metering device so as to return the indicating means thereof to zero position when the conduit and consequently the wells are not operatively filled.

In my preferred embodiment I suitably pivot on the block 32, mounted within the indicating means casing 34 by means of the knife edge 36, the beam 37 intermediate and above said wells, which preferably have the open-top ends 23 thereof discharging within said indicating casing 34.

I also provide relatively heavy preferably cylindrical displacers 38ª and 38ᵇ adapted to be immersed when in operative position in the liquid within the wells 22ª and 22ᵇ and I provide means such as the cords 40ª and 40ᵇ for connecting each respective end 42ª and 42ᵇ of the beam 37 to its respective displacer 38ª and 38ᵇ.

It is thus obvious that the beam 37 will be tilted about its pivot 36 an amount in proportion to the height of liquid in the wells 22ª and 22ᵇ, which, as explained, is responsive to the rate of flow through the conduit 14. The beam 37, cords 40ª and 40ᵇ and displacers 38ª and 38ᵇ form the members which move in response to the differential. I preferably so construct the upstream end of these movable members, namely the displacement weight of the displacer 38ª, cord 40ª and upstream end 42ª of the beam 37 slightly heavier than the downstream respective portions 38ᵇ, 40ᵇ and 42ᵇ, in my preferred embodiment, either by additionally weighting in casting the upstream end 42ª of the beam 37 or by supplying an adjustable supplemental weight 44 thereto. The upstream end 42ª of the beam 37 is also provided with an adjustable zero stop 46 which may be located on the upper side of the block 32 and the upstream portions of said movable members are made slightly heavier than the downstream respective portions thereof to cause said beam 37 of its own weight to automatically return to zero position against said stop on absence of an operative amount of liquid either in the wells 22ª or 22ᵇ or in the conduit 14.

Said displacers 38ª and 38ᵇ are also preferably weighted at the lower ends thereof as at 48 so as to cause them to remain immersed in a vertical position. The upstream and downstream portions of said movable members just referred to are also preferably constructed to permit the upstream displacer 38ª to more deeply immerse than the downstream displacer 38ᵇ to balance said movable members when the displacers are immersed in operative position. While this may be done in any convenient manner, it is preferably done in my preferred embodiment by making the cord 40ª slightly longer than the cord 40ᵇ.

It is obvious that any suitable type of indicating means may be actuated by the beam 37. In order, however, that the beam 37 may be made of relatively small size, I preferably attach a resisting means 50 to said beam preferably at the pivot point 36 thereof to resist the angular tilting movement caused by said differential. In this feature the counter weight 50 functions somewhat as a pendulum. As it is desired to meter the quantity of flow and have the indicating means directly indicate the quantity of flow, it is obvious that it is necessary to translate the displacement of the displacers 38ª and 38ᵇ, or in general, the movement caused by the pressure differential to cause the quantity indicating means to move in proportion to the square root of the differential.

While any means may be provided for this purpose, I preferably employ a cam means 52 mounted on said beam and controlled in its movement by the movement of the beam and constructed in accordance with the square root relation of rate to differential. In my preferred embodiment the cam means 52 is adapted to abut the means or cord 54 that I provide for attaching the counter weight 50 or resisting element to the beam 37 and is also adapted to balance the weight of the indicating means. It is also obvious when the beam is moved off zero position that the weight 50 will abut the cam 52 to exert a moment against the beam 37 in opposition to the action of the displacers 38ª and 38ᵇ. The cam means 52 is designed to produce an even rate spacing. It is also apparent that the cam is so constructed that near its zero position the cord 54 will not abut the modified cam surface thus causing the displacers to position the beam as the first power, and also at its zero position the cam 52 will be entirely out of the way of the cord 54 thus permitting a ready return of the operating parts of the device to zero position.

Although it is obvious that any type of indicating means, such as indicators, registers, recorders, etc. as is well known in the art, may be employed as my preferred type of indicating means, I preferably provide integrating mechanism which in my preferred embodiment comprises a constant-speed clock 56 driven by suitable mechanism (not shown) and the counter mechanism 58 adapted to be actuated by said clock preferably having a rotatable portion such as the roller 60 thereof in contact with the face of a disc 62 driven by said clock. One of said members, i. e., either the clock 56 or the counter mechanism 58 is stationary and the other is preferably carried by the movable beam 37, in my preferred embodiment the clock 56 being stationary and the counter mechanism 58 being carried by said beam. In my preferred embodiment I also provide means to indicate the rate of flow. Said means includes a stationary scale 70 stationarily mounted on the frame and a pointer 72 also carried by the movable beam 37 and movable over said scale 70 with the counter mechanism 58.

The quantity rate indicating means is provided with true quantity indicia 64 thereon so as to integrate directly the quantity of flow. This is made possible by changing the movement of the movable member of the indicating mechanism into a movement proportionate to the square root of the differential, in my preferred embodiment by means of the cam 52 which as stated is designed in this manner to produce an even rate spacing. In my improved type of integrating mechanism shown the quantity indicia consists of quantity marks on the counters 66. As hitherto explained, the integrating means will stop integrating when an operative amount of liquid is absent in the wells 22ª and 22ᵇ or the conduit 14 due to the fact that the upstream ends of the movable members are weighted to bring the beam, and hence the integrating member and indicating member attached thereto, to zero position when this occurs. To insure, however, that the integrating mechanism will stop integrating when no longer desired or near zero position, the center 68 of the disc 62 is preferably made stationary.

In use, when the gate 16 is manually opened, water will start to flow through the conduit 14 in the direction indicated by the arrow. Movement of the liquid through the conduit 14 will cause a pressure differential to be set up by Venturi meter tube 20 thus causing a differential in the height of liquids in the wells 22ª and 22ᵇ. As the displacers and movable elements are balanced in operative position in the manner hitherto described, the displacers 38ª and 38ᵇ will cause the beam 37 to pivot in response to the differential. The cam 52, however, will cause the movement of the beam 37 and hence that of the counter mechanism 58 carried by said beam to move in proportion to the square root of the differential and my device will function to integrate the quantity of flow so long as an operative amount of water remains in the wells 22ª and 22ᵇ and conduit 14, the counters directly indicating the total quantity of flow. In the embodiment shown I employ a Venturi meter tube as the differential producing means and the true differential producing portion thereof comprises the converging portion 21. Inasmuch as in my preferred embodiment the upstream well is attached to the conduit 14 above said pressure differential producing converging portion 21 and said downstream well is attached to the throat 28 below said pressure differential producing converging portion 21. When referring in the claims to "opposite sides of the pressure differential producing means" I refer to the converging cone 21 which is the true differential producing means of the Venturi tube shown in my preferred embodiment.

It is apparent that I have provided a liquid meter particularly adapted for measuring low-head liquids which will directly indicate the true quantity of flow directly in quantity units and one which will directly indicate the flow without the interposition of any independent mechanism between the movable beam thereof and the indicating means thereof and also an indicating device in which the metering means thereof will automatically return to zero whenever the conduit is not operatively filled and also whenever the wells thereof are not operatively filled and one which will stop metering when near the zero position thereof.

It is understood that my invention is not limited to the specific embodiment shown and that various deviations may be made therefrom without departing from the spirit and scope of the appended claims.

What I claim is:

1. In a low-head liquid metering device having a zero, in combination, a conduit, means to produce a pressure differential responsive to the rate of flow therethrough, differential responsive means controlled by said differential and having liquid containing portions open to the atmosphere, means connecting each portion to said conduit on opposite sides of said differential producing means and indicating means controlled by said differential responsive means, and means to return the indicating means to zero position when the liquid-containing portions of said differential responsive means are not operatively filled.

2. In a liquid metering device, in combination, a conduit means to produce a pressure differential responsive to the rate of flow therethrough, differential responsive means controlled by said differential and having open-top liquid containing portions, means connecting each portion to said conduit on opposite sides of said differential producing means, a beam, displacers, carried by the liquid in said open top liquid containing portions and means connecting said displacers to said beam, whereby said beam may be actuated by said differential responsive means, resisting cam means attached to said beam to resist the angular tilting movement caused by the differential, and quantity indicating means having quantity indicia and means connecting said quantity indicating means to said beam, whereby said quantity indicating means may be directly actuated by said beam.

3. In a liquid metering device, in combination, a conduit, means to produce a pressure differential responsive to the rate of flow therethrough, differential responsive means controlled by said differential and having open-top liquid containing portions, means connecting each portion to said conduit on opposite sides of said differential producing means, a beam, displacers, carried by the liquid in said open top liquid containing portions and means connecting said displacers to said beam, whereby said beam may be actuated by said differential responsive means, quantity indicating means and means mounted on said beam to cause the movement of said indicating means to be proportionate to the square root of the differential.

4. In a liquid metering device, in combination, a conduit, means to produce a pressure differential responsive to the rate of flow therethrough, differential responsive means controlled by said differential and having open-top liquid containing portions, means connecting each portion to said conduit on opposite sides of said differential producing means, a beam, displacers, carried by the liquid in said open top liquid containing portions and means connecting said displacers to said beam, whereby said beam may be actuated by said differential responsive means, resisting means including a cam attached to said beam to resist the angular tilting movement caused by the differential, and integrating means directly actuated by said beam to give the true quantity of flow.

5. In a liquid metering device, in combination, a conduit, means to produce a pressure differential responsive to the rate of flow therethrough, differential responsive means controlled by said differential and having open-top liquid containing portions, means connecting each portion to said conduit on opposite sides of said differential producing means, a beam, displacers, carried by the liquid in said open top liquid containing portions and means connecting said displacers to said beam, whereby said beam may be actuated by said differential responsive means, integrating means directly actuated by said beam to give the true quantity of flow, and means to return the integrating means to zero position when the liquid-containing portions of said differential responsive means are not operatively filled.

6. A low-head liquid meter for use in metering liquids in irrigation, sewerage and the like, comprising in combination, a conduit, means to produce a pressure differential responsive to the rate of flow therethrough, two open-top vertical wells, means connecting each well to said conduit on opposite sides of said differential producing means, a substantially horizontal balancing beam pivoted intermediate and above said wells, two relatively heavy cylindrical displacers, means to suspend a displacer from each end of said beam within each well, indicating means, and cam means mounted on said beam and connected to said indicating means to cause the indication of said indicating means to be proportionate to the square root of the differential.

7. A low-head liquid meter for use in metering liquids in irrigation, sewerage and the like, comprising in combination, a conduit, means to produce a pressure differential responsive to the rate of flow therethrough, two open-top vertical wells, means connecting each well to said conduit on opposite sides of said differential producing means, a substantially horizontal balancing beam pivoted intermediate and above said wells, two relatively heavy displacers, means to suspend a displacer from each end of said beam within each well, indicating means actuated by said beam, and a zero stop for said beam, the movable members including said beam, displacers and displacer suspending means having a slightly heavier upstream side to cause said beam to return to zero position against said zero stop on absence of an operative amount of liquid within said wells.

8. A low-head liquid meter for use in metering liquids in irrigation, sewerage and the like, comprising in combination, a conduit, a Venturi meter tube in said conduit, an open-top vertical well connected to the upstream end of said Venturi tube, an open-top vertical well connected to the throat of said Venturi tube, a substantially horizontal balancing beam pivoted intermediate and above said wells, two relatively heavy vertical displacers so weighted as to float so that the longitudinal axis of each is vertical, means to suspend a displacer from each end of said beam within each well, indicating means directly actuated by said beam, a zero stop for said beam, the movable members including said beam, displacers, displacer suspending means having a slightly heavier upstream side to cause said beam to return to zero position against said zero stop on absence of an operative amount of liquid within said wells.

9. A low-head liquid meter for use in metering liquids in irrigation, sewerage and the like, comprising in combination, a conduit, means to produce a pressure differential responsive to the rate of flow therethrough, two open-top vertical wells, means connecting each well to said conduit on opposite sides of said differential producing means, a substantially horizontal balancing beam pivoted intermediate and above said wells, two relatively heavy displacers, means to suspend a displacer from each end of said beam within each well, integrating mechanism comprising at least two members including a constant speed clock and a counter mechanism adapted to be actuated by said clock, one of said members being stationary and the other being carried by said beam, a cam carried by said beam, a weight, means to attach said weight near the pivot point of said beam and to abut said cam to cause the movement of said integrating mechanism to be proportionate to the square root of the differential and a zero stop for said beam adapted to abut said beam when the movable member of said integrating mechanism is brought to a zero position.

10. A low-head liquid meter for use in metering liquids in irrigation, sewerage and the like, comprising in combination, a conduit, means to produce a pressure differential responsive to the rate of flow therethrough, two open-top vertical wells, means connecting each well to said conduit on opposite sides of said differential producing means, a substantially horizontal balancing beam pivoted intermediate and above said wells, two relatively heavy displacers, means to suspend a displacer from each end of said beam within each well, resisting means, means to attach said resisting means to said beam to resist the angular tilting movement caused by said differential, integrating mechanism comprising at least two members including a constant speed clock and a counter mechanism adapted to be actuated by said clock, one of said members being stationary and the other being carried by said beam, and a cam carried by said beam adapted to abut said attaching means.

11. A low-head liquid meter for use in metering liquids in irrigation, sewerage and the like, comprising in combination, a conduit, means to produce a pressure differential responsive to the rate of flow therethrough, two open-top vertical wells, means connecting each well to said conduit on opposite sides of said differential producing means, a substantially horizontal balancing beam pivoted intermediate and above said wells, two relatively heavy vertical displacers so weighted as to float so that the longitudinal axis of each is vertical, means to suspend a displacer from each end of said beam within each well, resisting means, means to attach said resisting means to said beam to resist the angular tilting movement caused by said differential, integrating mechanism comprising at least two members including a constant speed clock and a counter mechanism adapted to be actuated by said clock, one of said members being stationary and the other being carried by said beam, a cam carried by said beam adapted to abut said resisting means attaching means to cause the movement of said counter mechanism to be proportionate to the square root of the differential and a zero stop for said beam, the movable members including said beam, displacers, displacer suspending means having a slightly heavier upstream side to cause said beam to return to zero position against said zero stop on absence of an operative amount of liquid within said wells.

12. A low-head liquid meter for use in metering liquids in irrigation, sewerage and the like, comprising in combination, a conduit, means to produce a pressure differential responsive to the rate of flow therethrough, two open-top vertical wells, means connecting each well to said conduit on opposite sides of said differential producing means, a substantially horizontal balancing beam pivoted intermediate and above said wells, two relatively heavy displacers, means to suspend a displacer from each end of said beam within each well, resisting means, means to attach said resisting means to said beam to resist the angular tilting movement caused by said differential, indicating means actuated by said beam and a cam carried by said beam adapted to abut said resisting means attaching means to cause the movement of said indicating means to be proportionate to the square root of the differential.

RICHARD E. CONNET.